(12) United States Patent
Vincent et al.

(10) Patent No.: US 6,643,285 B1
(45) Date of Patent: Nov. 4, 2003

(54) MESSAGE BASED PACKET SWITCH BASED ON A COMMON, GENERIC BUS MEDIUM FOR TRANSPORT

(75) Inventors: John Edward Vincent, Ottawa (CA); George F. Irwin, Kanata (CA); Gary M. Depelteau, Ottawa (CA); Tony Huang, Novato, CA (US); David A. Fisher, Kanata (CA); James L. Watchorn, Nepean (CA); Melhem I. Chaar, Gloucester (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/024,243

(22) Filed: Feb. 17, 1998

(51) Int. Cl.[7] ............................................. H04L 12/56
(52) U.S. Cl. ...................... 370/389; 370/429; 370/474; 370/412; 370/502
(58) Field of Search ................................. 370/389, 351, 370/364, 352, 355, 428, 465, 229, 395, 397, 218, 399, 420, 409, 470, 391, 471, 392, 474, 393, 475, 413, 414, 418, 419, 252, 253, 398, 422, 423, 426, 231, 232, 233, 234, 412, 502

(56) References Cited

U.S. PATENT DOCUMENTS 5,164,938 A * 11/1992 Jurkevich et al. ............. 370/60
5,850,395 A * 12/1998 Hauser et al. ............... 370/398
5,854,789 A * 12/1998 Lesch et al. ................. 370/395

(List continued on next page.)

OTHER PUBLICATIONS

Giovanni Mancini, Dave Yurach; "A Methodology for HW–SW Codesign in ATM" Proceedings of the design automation conference (DAC), New York, IEEE, US vol. Conf. 32, Jun. 12, 1995, pp. 520–527, XP000546357.*

T.K. Helstern, M. Izzo, "Functional Architecture for a Next Generation Switching System"; Bell Communications Research, 1990, IEEE, Comp. Soc. Pressu, U.S. vol. 2, Conf. 9, Jun. 3, 1990; pp 790–795.

G. Mancini, D. Yurach, S. Boucouris; "A Methodology for HW–SW Codesign in ATM"; Proceedings of the Design Automation Conference, San Francisco, Jun. 12–16; 1995, Proceedings of The Design Automation Conference (DAC), New York, IEEE. US vol. Conf. 32, Jun. 12, 1995, pp 521–527.

H. Imagawa, Y, Iwase, E. Masuda; "A Functional Block Hardware Architecture for Switching Systems"; IEICE Trans. Commun. vol. E80–B; No. 3, Mar. 1997, pp 442–447.

*Primary Examiner*—Dang Ton
*Assistant Examiner*—Tri H. Phan (57) ABSTRACT

A packet switch has a switching unit (SU) for switching packets between network links and a computing unit (CU) connected to the SU through a network link for implementing software control functions over the SU. The SU is formed of different functional components interconnected by generic buses. The components communicate with one another using program data units (PDUs) that are formatted and transmitted according to a shared device protocol. The communication between the components occurs by placing PDUs in bus frames that are passed from component to component. Information is exchanged between the components by adding information to or dropping information from the fields of the PDUs, or by concatenating new fields to the PDUs, as the frames pass from component to component. By using a generic bus to implement PDU-based interconnections within the SU, all the components are forced to support a common interface. Changes to the implementations of any component's interface can thus be accommodated by changing the PDU format as opposed to changing the interfaces of connected components. The new packet switch architecture decouples the components on the switch so that they can be upgraded or otherwise modified independently of one another.

22 Claims, 9 Drawing Sheets

U.S. PATENT DOCUMENTS

| | | | |
|---|---|---|---|
| 5,892,924 A | * 4/1999 | Lyon et al. | 395/200.75 |
| 5,963,555 A | * 10/1999 | Takase et al. | 370/395 |
| 6,014,382 A | * 1/2000 | Takihiro et al. | 370/399 |
| 6,072,799 A | * 6/2000 | Cheung et al. | 370/395 |
| 6,259,699 B1 | * 7/2001 | Opalka et al. | 370/398 |

* cited by examiner

Prior Art

IOM ingress CIB

| Ingress_Port ID | | GFC/VPI |
|---|---|---|
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 5

CM ingress CIB

| WBADR | | I flags |
|---|---|---|
| Ingress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 6

TUB ingress CIB

| WICN | | I flags |
|---|---|---|
| Ingress flags | | |
| WBADR | | I flags |
| Ingress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 7

QMS egress CIB

| RICN | E flags |
|---|---|
| RABDR | E flags |
| Egress flags ||

Fig. 8

APS egress CIB

| RICN | | E flags |
|---|---|---|
| RABDR | | E flags |
| Egress flags | | |
| Egress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 9

TUB egress CIB

| RICN | | E flags |
|---|---|---|
| RABDR | | E flags |
| Egress flags | | |
| Egress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 10

CM egress CIB

| Egress flags | | |
|---|---|---|
| Egress_Port ID | | GFC/VPI |
| VPI/VCI | VCI | PT/CLP |
| Payload 1 | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload |
| Payload | Payload | Payload 48 |

Fig. 11

APS_QMS CUB

| rate_update_ICN | flags |
|---|---|
| SCH_rate | |
| RM_cell_ICN | RMF |
| RM_flags | |

Fig. 12

APS_TUB CUB

| DGCRA_rate | RMF |
|---|---|
| DGCRA_rate | |

Fig. 13

IOM_QMS CUB

| Port ID | PLFC |
|---|---|

MESSAGE BASED PACKET SWITCH BASED ON A COMMON, GENERIC BUS MEDIUM FOR TRANSPORT

FIELD OF THE INVENTION

This invention relates to the field of broadband communications. More specifically, it relates to the architecture of packet switches, such as Asynchronous Transfer Mode (ATM) switches.

BACKGROUND OF THE INVENTION

Traditional packet switch architectures are costly to maintain and upgrade because they tend to couple components that implement unrelated functions. Coupling of components occurs when their designs are highly interdependent on each other, such that one component cannot be changed without also changing the other component.

One example of coupling is the incorporation of one or more embedded computing systems into the platform on which switching takes place. This feature is undesirable because it couples the computing system, which implements software control functions, with other components that implement unrelated functions such as routing and automatic parameter control. Tight coupling between the embedded computing system and the other components on the switch means that the computing system cannot be changed without also changing all the other components on the switch. Because the embedded computing systems require upgrades far more often than other components on the switch, this feature drives-up maintenance and upgrade costs, and is therefore undesirable. Known packet switch architectures address this problem by moving software control functions, and any embedded computing systems, off the switching platform to standard computing platforms such as workstations. In such architectures, the platform holding the rest of the switching platform is referred to as a switching unit (SU), while the platform holding the decoupled computing system is hereinafter referred to as a computing unit (CU). The CU is connected to the SU by a high-speed link, such as an Ethernet link or an ATM link. The use of a CU and SU connected only by a high-speed link enforces a strict interface between the two that allows for the CU to be upgraded and scaled independently of the components comprising the SU.

Another example of coupling takes place between components that implement line interface functions, which do not change often, and components that implement cell processing functions, which are in a relative state of continual flux. Known packet switch architectures address this problem by centralizing the components that implement cell processing functions, into packet processing modules. The packet processing modules are separated from the modules containing the line interface components, which are hereinafter referred to as line interface modules, using a well-defined and stable interface.

Yet another example of coupling is the use of function-specific communication channels for connecting components on the SU to each other. As with the other examples of coupling, this coupling prevents functionally unrelated components that are connected to each other from being upgraded independently of one another. Unlike the other examples of coupling however, correctional adjustments to the packet switch architecture have yet to be developed in response to this coupling problem.

More specifically, in current packet switch architectures, the components within the SU are interconnected to one another using a plurality of dedicated unique connections. That is, the number of buses, the width of the buses, the signals used to coordinate transfers, the timing of the buses and other fundamental characteristics vary from connection to connection. Such connections are undesirable because they couple components that are in a constant state of flux to more stable components. It is desirable to protect the investments made in the more stable components by decoupling them from the unstable components. It is preferable that the decoupling be achieved without significantly reducing switching performance.

Partitioning of a switch architecture involves mapping a plurality of functions that need to be performed on the switch, to a plurality of components that can perform those functions. In partitioning a switch architecture, it is often desirable that closely related functions be mapped on to the same component, since such functions tend to have similar context memory requirements. Such mappings optimize the utilization of many switch resources, including the memory.

SUMMARY

It is thus desirable to develop a new packet switch architecture that decouples components on the switch so that they can be upgraded or otherwise modified independently of one another. It is also desirable to achieve this object without significantly affecting the performance of the switch.

The aforementioned objects can be achieved by a packet switch that comprises a switching unit (SU) for switching packets between network links and a computing unit (CU) connected to the SU through a network link for implementing software control functions over the SU, wherein the SU comprises a plurality of components that are interconnected by generic buses, and wherein the components communicate with one another using program data units (PDUs) that are formatted and transmitted according to a shared device protocol.

The communication between the components occurs by placing PDUs in bus frames that are passed from component to component. Information is exchanged between the components by adding information to or dropping information from the fields of the PDUs, or by concatenating new fields to the PDUs, as the frames pass from component to component.

By using a generic bus to implement PDU-based interconnections within the SU, all the components are forced to support a common interface. Changes to the implementations of any component's interface can thus be accommodated by changing the PDU format as opposed to changing the interfaces of connected components. The PDU format, and the means by which components access the PDUs, are designed to facilitate the adjustments that must be made by components every time a connected component is replaced and the format must change. A change in one component thus does not necessitate changes in the components connected to it. This means that the components of the architecture are decoupled.

In yet another aspect of this invention, the advantages gained by using a generic bus are optimally leveraged by partitioning the switch architecture such that functions that tend to change at the same time are implemented by the same components, where possible. The architecture is also partitioned so that related functions are mapped on to the same components. More specifically, an architecture of a switch is described that comprises a CU and an SU, and wherein the SU comprises the following components: an input/output module (IOM) for terminating network links; at least one cell memory (CM) for storing packets received from the network links until they are scheduled for transmission from the switch; and at least one cell processing module (CPM) directly connected to the memory for controlling the packet traffic flowing through the switch.

A partitioning of the CPM is also described, wherein the CPM comprises the following components: a Translation, Usage Parameter Control, and Buffer Manager (TUB) component that is connected to a component external to the CPM, and which is used for performing ingress and egress address translations, for implementing policing functions, and for performing buffer management functions; an OAM Control Module (OCM) component that is connected to the TUB ASIC, and which is used for terminating and sourcing Operations, Administration and Maintenance (OAM) flows; an Available Bit Rate (ABR) processing subsystem (APS) component that is connected to the OCM component, and which is used for implementing rate based flow control; and a Queue Management and Scheduling Subsystem (QMS) component that is connected to the APS component, and which is used for maintaining packet queues and for scheduling packet transmissions from the switch.

Another aspect of this invention relates to a switching unit for switching packets between network links and comprises a plurality of functional components interconnected by generic buses that exchange information with each other, and more specifically, a method of replacing any one of the components, said one component hereinafter being referred to as the old component, with a new component that exchanges different information with other components, said method comprising the steps of: adding, removing or resizing the fields of the bus frame which the changed component must access in order to exchange information with other components; and programming the new component, and reprogramming the other components, to perform the adding, dropping and concatenating functions on different parts of the frames such that all components are still accessing appropriate information within the PDUs.

BRIEF DESCRIPTION OF THE DRAWINGS

Embodiments of the invention will now be disclosed with reference to the accompanying drawings, in which.

DETAILED DESCRIPTION OF THE PREFERRED EMBODIMENTS

At least two novel changes are applied to prior-art packet switch architectures to obtain the novel packet switch disclosed herein.

Figure 1A:
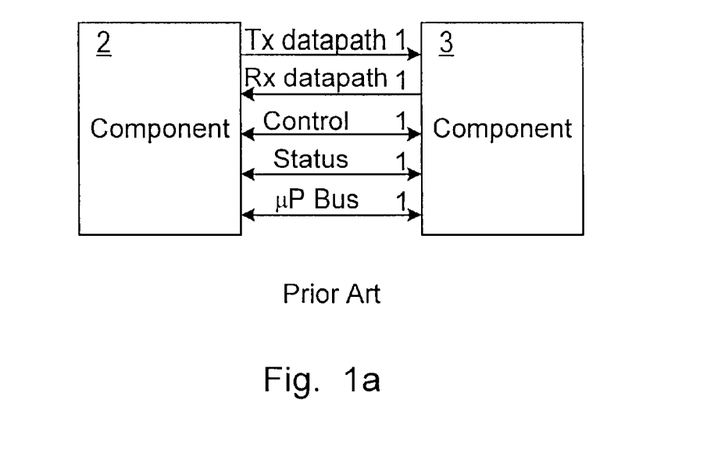
FIGS. 1a, 1b and 1c illustrate the differences between the traditional interconnection method used by prior art packet switches, and a novel interconnection method according to an aspect of this invention.
Figure 1B:
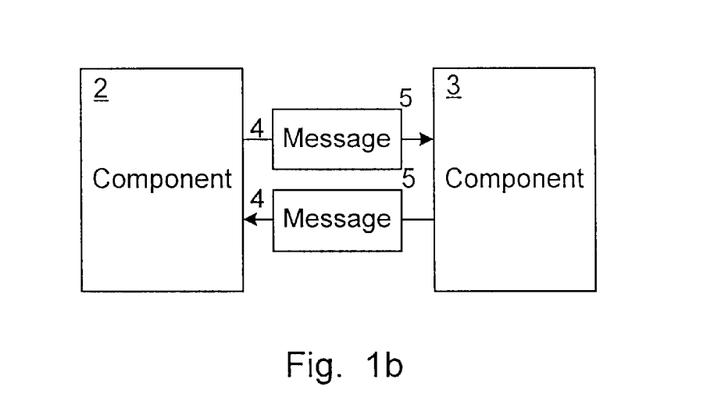
Figure 1C:
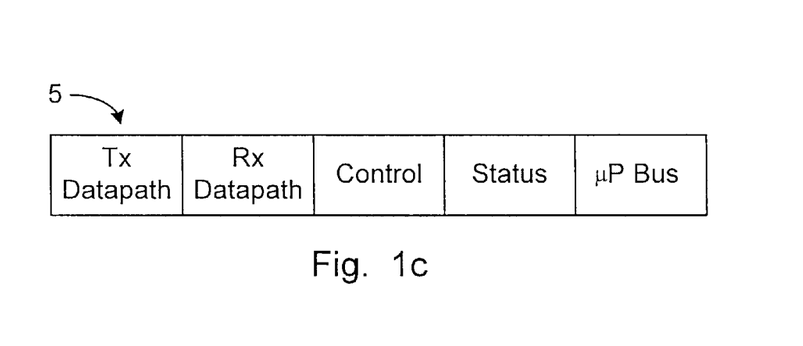

The first change is the implementation of novel message-based methods of interconnecting components on packet switches, the methods being centred around the use of a generic bus. FIGS. 1a, 1b and 1c illustrate the differences between the traditional interconnection method used by prior art packet switches, and a novel interconnection method according to an aspect of this invention. The traditional approach, which is illustrated in FIG. 1a, requires a plurality of control lines 1 that are particular to the components 2,3 being interconnected. By contrast, the novel approach illustrated in FIG. 1b and described herein, is implemented using a pair of generic unidirectional buses 4 that carry program data units (PDUs) 5 in accordance with protocols shared by the interconnected components 2,3. In other embodiments of this approach, a single bidirectional bus could be substituted for the unidirectional buses 4. The same type of bus 4 is used to interconnect all sets of components on the switch. FIG. 1c shows that the PDU 5 of FIG. 1b contains all the information being communicated across the plurality of control lines 1 in FIG. 1a during a given period of time. Differences in the information that has to be communicated between different sets of components, are accommodated by varying the contents of the PDUs, rather than by varying the structures of the connections shared by the components 2,3 and therefore the structures of the components 2,3. Decoupling of the components 2,3 is thus achieved.

A second change that is applied in order to achieve the aforementioned objects is implementing a new partitioning of the traditional packet switch architecture. A new partitioning is carried out to optimally leverage the advantages gained by decoupling the components using the aforementioned messaging method. Leverage can be achieved by ensuring, where possible, that functions which tend to change at the same times are implemented by the same components. If the architecture is not partitioned to achieve this goal, then the advantages gained by decoupling components will be lost since each decoupled component will have to be upgraded at the same times anyway. Another goal in partitioning the architecture is to map related functions on to the same components in order to optimize usage of resources such as memory.

In introducing the components that comprise the architecture, the novel partitioning is described first. The novel messaging method is described afterwards.

Figure 2:
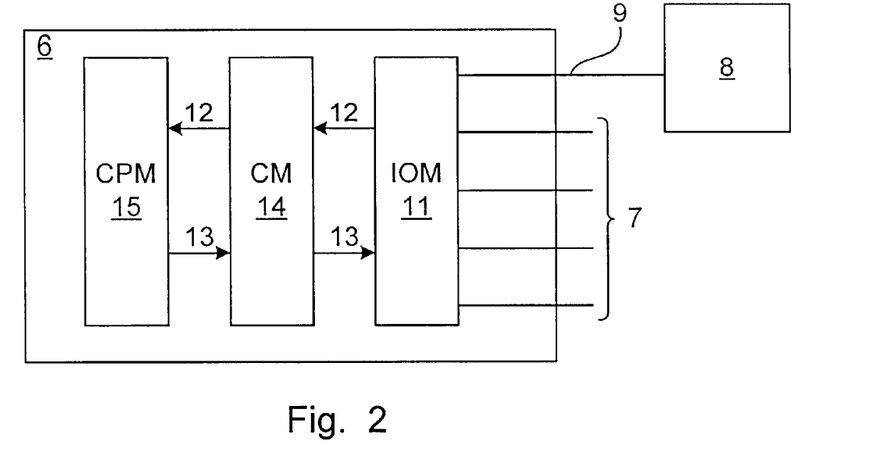
FIG. 2 illustrates an Asynchronous Transfer Mode (ATM) switch architecture that is partitioned according to an embodiment of this invention.

FIG. 2 illustrates an Asynchronous Transfer Mode (ATM) switch architecture that is partitioned according to an embodiment of this invention. Though an ATM switch is illustrated, it is to be noted that the novel methods and apparatus described herein can also be applied to other sorts of packet switches. In FIG. 2, a switching unit 6 (SU) terminates several network links 7 supporting the ATM suite of protocols, such as those defined in the User-Network Interface (UNI) specification. As in some prior art switches, the software control functions are implemented on a computing unit (CU) 8 that is connected to the SU 6 through a high-speed link 9, which is an OC-3 or OC-12 link in a preferred embodiment. All communication between the CU 8 and the SU 6 is carried out according to the ATM suite of protocols in a preferred embodiment. In other preferred embodiments, other protocol suites such as the Ethernet suite of protocols could be implemented over the link 9. It is to be noted that this embodiment involves decoupling the components that implement software control functions from the components that implement other functions, as is the case with some prior art architectures.

The SU 6 contains an input/output module 11 (IOM) that terminates one or more of the network links 7. The IOM 11 is connected through a pair of unidirectional buses 12,13 (one bus for each direction) to a cell memory (CM) 14, which in turn is connected through further pairs of unidirectional buses 12,13 to a cell processing module (CPM) 15. It is to be noted that the embodiment of FIG. 2 involves decoupling the IOM 11 which implements line interface functions, from the CPM 15 which implements cell processing functions, as is the case with some prior art architectures.

The buses 12,13 are each implemented by a generic bus which carries messages, such as the PDU 5 of FIG. 1b and FIG. 1c, in accordance with a single set of protocols regardless of the modules being interconnected. More specifically all the interconnections between modules of the preferred embodiment of FIG. 2 are achieved using the pairs of unidirectional buses 12,13 that each comprise 24 signal lines, each signal line having a data rate of 622 Mbps. This gives the bus a total throughput of 15 Gbps, which easily accommodates both network traffic flows through the switch of up to 10 Gbps as well as any internal messaging flows taking place between the modules. The modules place PDUs on and remove PDUs from the bus using known frame-based timing structures, which are hereinafter referred to as bus frames. The frames used in a preferred embodiment each comprise 432 data transfers, with each transfer resulting in the transmission of a 24 bit word across the 24 signal-line bus. A complete frame is transferred though the switch every 694 ηs. The 432 data-transfer length of each frame makes it large enough to store several cell-sized PDUs.

The IOM 11 implements the interface between the buses 12,13 and the network links 7. Since the IOM 11 has full access to the buses 12,13, its throughput can extend up to 15 Gbps. It is to be noted that several smaller IOMs can replace the single IOM 11 of FIG. 2.

The cell memory (CM) 14 serves as the storage element of the SU 6. The memory 14 buffers cells received from the IOM 11 until they are scheduled for transmission by the CPM 15. The CM 14 includes components that implement a buffer address management function that controls the use of addresses in the cell memory, and a cell header and cell multiplexing function which is required to effect virtual path (VP) switching, and to insert cells into the egress flow.

The CPM 15, which is described more fully below, implements cell processing functions that control the cell traffic flowing through the switch.

Cells flow into the SU 6 through the network links 7 and the IOM 11. The cells use the ingress bus 12 to flow from the IOM 11 into the CM 14 where they are buffered. While the cells are buffered in the CM 14, cell processing functions relating to the buffered cells occur in the CPM 15. Once components inside the CPM 15 decide certain buffered cells are to be transmitted from the SU 6, the cells are removed from the CM 14 and sent out though the egress connection 13 to the IOM 11, where transmission across one or more network links 7 is effected. The CPM 15 occasionally generates its own cells for transmission through the same egress path.

Figure 3:
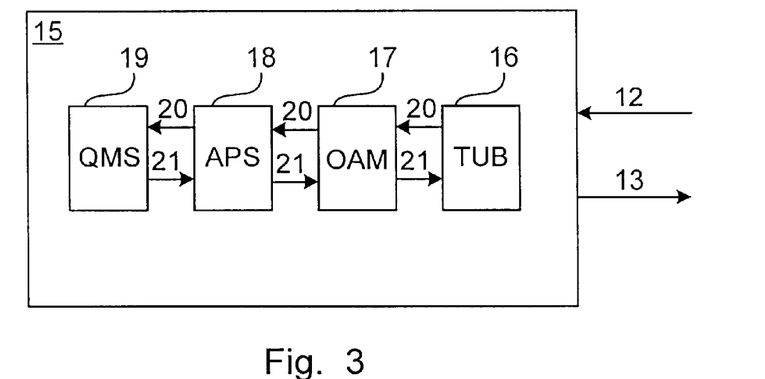
FIG. 3 illustrates an architecture of the cell processing module (CPM) of FIG. 2 according to an embodiment of this invention.

FIG. 3 shows that the CPM 15 is partitioned into four logic components that are each implemented as an application specific integrated circuit (ASICs) in a preferred embodiment. It is to be noted that other implementations of the logic components are also possible. Each component is capable of supporting a cell processing throughput of 2.5 Gbps. The CPM 15 comprises a Translation, Usage Parameter Control, and Buffer Manager (TUB) component 16, an Operations, Administration and Maintenance (OAM) control module (OCM) component 17, an Available Bit Rate (ABR) processing subsystem (APS) component 18, and a queue management and scheduling subsystem (QMS) component 19. Interconnecting the components 16 through 19 are further generic unidirectional buses 20, 21 which handle messages that accord with a single set of protocols. It is to be noted that because the architecture described herein is recursive in nature, in other embodiments of the novel architecture, each of these logic components could be replaced by a plurality of logic components that are themselves partitioned and interconnected in accordance with the same concepts used in partitioning and interconnecting the components comprising the SU 6 and the CPM 15.

The buses 20, 21 are smaller versions of the buses 12,13. More specifically twelve signal lines are used to implement the buses 20, 21 for a total bandwidth of 7.5 Gbps, as opposed to the 24 lines used to implement the buses 12, 13. The interface from the buses 12, 13 to the smaller buses 20,21 is implemented by an encapsulating logic ring (ELR) 22 that is described below.

The TUB 16 performs both ingress and egress address translations, implements the Usage Parameter Control (UPC) protocol (more generally known as policing), and performs buffer management functions related to CM 14 usage. It is to be noted that the TUB 16 would implement the policing function using the Network Parameter Control (NPC) protocol for links 7 that are supporting the protocols defined by the Network-Network Interface (NNI) specification. The translation function converts the ATM header and port identity into an internal connection number (ICN) in the ingress direction. The reverse conversion is also performed by the TUB 16 in the egress direction. The buffer management function is primarily focused on the implementation of cell discard algorithms. The TUB 16 receives policing parameter updates from the APS 18, in order to implement a dynamic generic cell rate algorithm (DGCRA) policing function for Available Bit Rate (ABR) connections.

The OCM 17 implements the functionality defined by ITU-T Recommendation I.610. The OCM 17 can terminate and source all OAM flows. The OCM 17 can monitor all arriving cells for OAM cells and insert OAM cells into an egress cell stream in order to support performance management flows.

The APS 18 implements rate based flow control as defined in the ATM Forum (ATMF) TM4.0 specification. The APS 18 monitors cell traffic, receives and processes resource management (RM) cells, and executes rate calculation algorithms. The APS 18 additionally provides rate update and RM cell status information to the scheduler in the QMS 19 in order to allow the latter to ensure that the Quality of Service (QoS) requirements of all supported applications are met. The APS 18 also provides information that allows the TUB 16 to update its policing parameters.

The QMS 19 performs two primary functions—the maintenance of cell queues and the scheduling of cell transmissions. In order to support rate-based scheduling, the QMS 19 includes a per connection shaper. The QMS 19 also implements a two-stage output queueing structure. Cells are queued on a per connection basis in the first stage. At the second stage, connections are queued according to the type of traffic being supported, in order to implement QoS guarantees and virtual ports.

Communication takes place within the above-described architecture by transmitting PDUs such as the PDU 5 of FIG. 1 across the generic buses 12,13,20,21. Generally, modules or components situated on the buses 12,13,20,21 (the modules or components collectively referred to as bus components hereinafter) wishing to send information to another given bus component, write information to a field of a PDU that flows through all the bus components. When the PDU arrives at the other given bus component, the given bus component reads the information from the field.

There are three types of PDUs that are transferred between the bus components. The first type is a cell information block (CIB). CIBs are inserted into bus frames which are sent from one bus component to another.

CIBs are created either when a cell arrives at the switch, or when a cell is preparing to depart from the switch. The information each CIB contains is specific to a cell entering or leaving the switch through an IOM 11. A CIB comprises several fields of bits. CIBs associated with the arrival of a cell from the network are referred to as ingress CIBs, while those associated with the departure of a cell for the network are referred to as egress CIBs.

As a CIB is passed from one bus component to another, information can be concatenated to, added to or dropped from the CIB. Concatenation occurs when a bus component concatenates new fields of information to the received CIB before sending it to the neighbouring down-stream bus component. Adding occurs when a bus component replaces information in fields of the received CIB, with new information. Dropping occurs when a bus component reads information from fields of the received CIB. This method of communication allows the downstream bus components to have visibility of the control functions being implemented by the upstream bus components. Bus components can also create or consume CIBs depending on which functions they support. Finally, a bus component can allow CIBs which contain information intended for other downstream bus components, to simply pass through to those other components.

Since a CIB is moved along one of the buses 12,13, 20, 21 inside a bus frame, its size is an integer multiple of the number of bits per transfer that is possible on the bus. If the CIB is flowing through one of the smaller buses 20, 21 for example, its size is an integer multiple of 12 bits. Likewise, if the CIB is flowing through is one of the larger buses 12, 13, then its size is an integer multiple of 24 bits. The last data transfer comprising a CIB may not always be fully populated by information.

Figure 4:
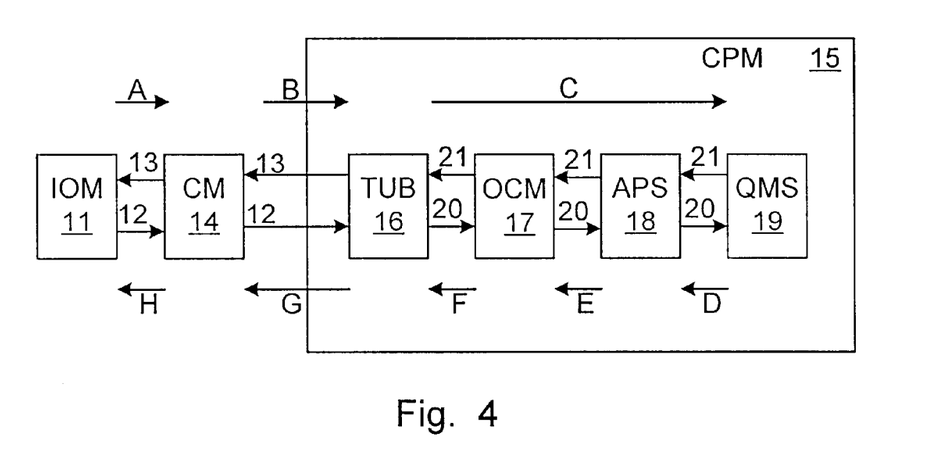
FIG. 4 illustrates an overall chronology of the journey of a cell information block (CIB) through the architecture of FIGS. 2 and 3.

FIG. 4 illustrates the overall chronology of the journey of a CIB through the architecture of FIG. 2 and 3. The letter-labels are used to distinguish between different stages of the journey. These stages are described below. It is to be noted that the names used to refer to the CIB change as it progresses through the SU 6, and as its composition is varied as a result of the operations performed on it by the bus components.

Figure 5:
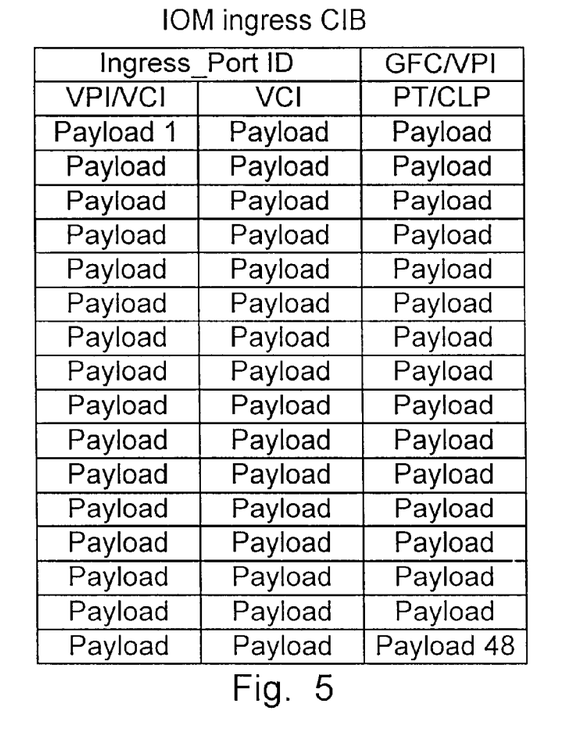
FIG. 5 illustrates an Input/Output Module (IOM) ingress CIB.

The CIB is created when a cell arrives at the switch through one of the network links 7, through the IOM 11. The IOM 11 creates a CIB called the IOM ingress CIB, which is illustrated in FIG. 5. FIG. 5 shows that the CIB is 24 bits wide, 24 bits being the amount of data sent in each data-transfer across the 24 signal lines of the buses 12,13. FIG. 5 also shows this particular CIB to be 18 data-transfers long. The CIB is long enough to contain the cell that just arrived at the switch, which itself comprises a generic flow control (GFC) field, a Virtual Port/Channel Identifier (VPI/VCI) field, a payload type (PT) field, a call loss priority (CLP) field and payload octets. The IOM 11 concatenates a port identity field, ingress_port ID, to the head of the cell.

Figure 6:
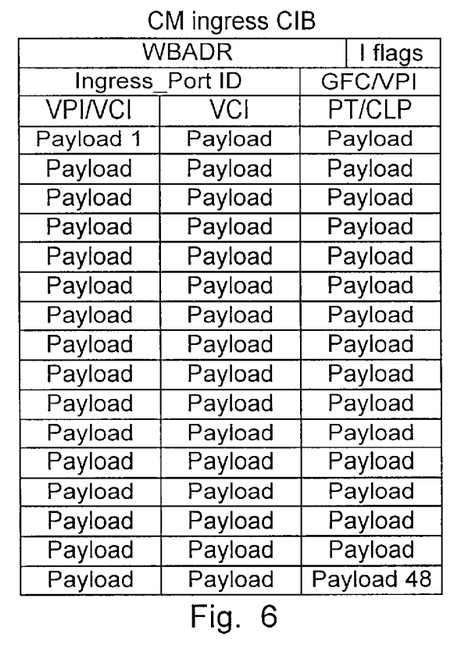
FIG. 6 illustrates a cell memory (CM) ingress CIB.

At stage A, the IOM ingress CIB is sent to the CM 14 which stores the cell. The CM 14 does not consume the cell inside the IOM ingress CIB however, just in case the incoming cell is a control cell, which would mean that its payload field would be useful to at least one of the bus components in the CPM 15. Instead, the CM 14 concatenates a field of flags the downstream components can use to determine whether or not they need to access the CIB, as well as a Write Buffer Address (WBADR) field containing the address of the cell in the CM 14 and passes the CIB to the CPM 15. The resulting CIB is referred to as a CM ingress CIB, which is 19 data transfers long. The CM ingress CIB is illustrated in FIG. 6.

Figure 7:
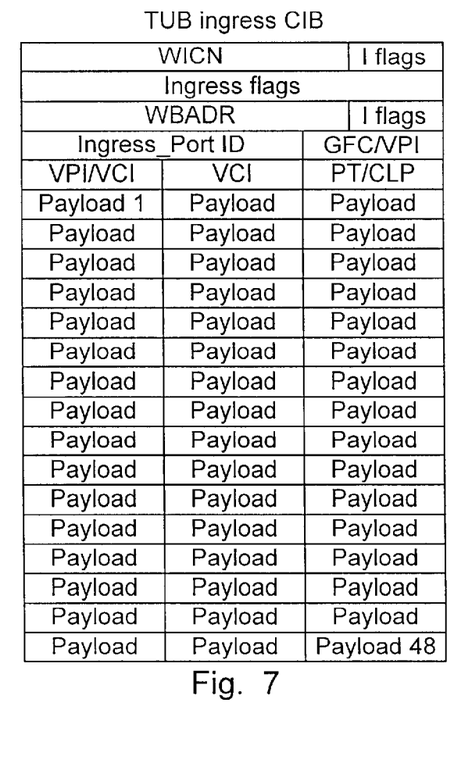
FIG. 7 illustrates a Translation, Usage Parameter Control, and Buffer Manager (TUB) ingress CIB.

At stage B, the CM ingress CIB is passed to the CPM 15. More specifically, the CM ingress CIB is passed to the TUB 16, once it is transferred from the twenty-four signal-line bus 12 to the smaller bus 20. Note that since the buses 20, 21 inside the CPM 15 are only 12 bits wide, the number of bits per transfer is reduced from 24 to 12. Each bus frame still comprises 432 data transfers. The TUB 16 receives the CM ingress CIB, reads the cell's header fields, and uses them to perform a table look-up. The result of the look-up is an Internal Connection Number (ICN) that the switch uses to refer to the VPI/VCI with which the contained cell is associated. The TUB 16 also reads the cell's header fields to apply discard functions to the contained cell. The TUB 16 generates a TUB ingress CIB, which is shown in FIG. 7. Though the TUB ingress CIB is 40 data transfers long since the bus 20 can only handle 12 bits per data transfer, it is shown as if it were flowing on the larger 24 signal line ingress bus 12 in order to facilitate the making of comparisons between it and the CIBs being transferred over the larger buses 12,13. FIG. 7 shows that the TUB ingress CIB is formed by concatenating the CM ingress CIB with a Write ICN (WICN) field containing the result of the ICN look-up functions, and an Ingress flags field containing the result of the discard functions.

At stage C, the TUB ingress CIB is forwarded to all other bus components in the CPM 15, which access the field to perform various cell processing functions that have been briefly described above. The OCM 17 and the APS 18, for example, read certain fields of the TUB ingress CIB for processing purposes, and then pass the CIB on to the next downstream component.

At the end of stage C, the QMS 19 reads the TUB ingress CIB that was passed through the APS 18. The QMS 19 notes the CM 14 address of the given cell associated with the CIB, and uses any control information in the CIB to help it schedule the given cell's transmission from the switch. Once the QMS 19 does not need to read any more of the contents of the TUB ingress CIB, the QMS 19 consumes the TUB ingress CIB.

Figure 8:
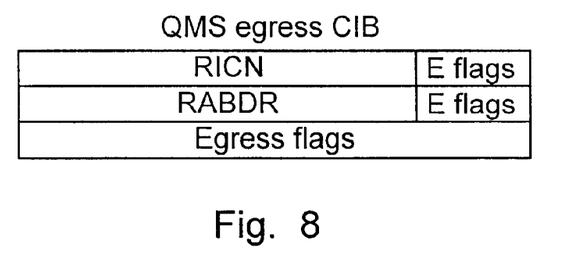
FIG. 8 illustrates a Queue Management System (QMS) egress CIB.

The copy of the cell that was stored in the CM 14 at stage A, remains buffered in the CM 14 until the QMS 19 determines the time has arrived to transmit the cell from the switch. When this time arrives, which is at stage D of the chronology illustrated in FIG. 4, the QMS 19 generates a QMS egress CIB, which is illustrated in FIG. 8. The QMS egress CIB contains the ICN and memory address within the CM 14 of the egress cell, which are held in the Read ICN (RICN) and Read Buffer Address (RBADR) fields respectively. A miscellaneous collection of flags containing control information that is related to the egress cell are also included in the Egress flags field. The QMS egress CIB is six data transfers long, assuming the egress bus 21 within the CPM 15 is only 12 signal lines side.

Figure 9:
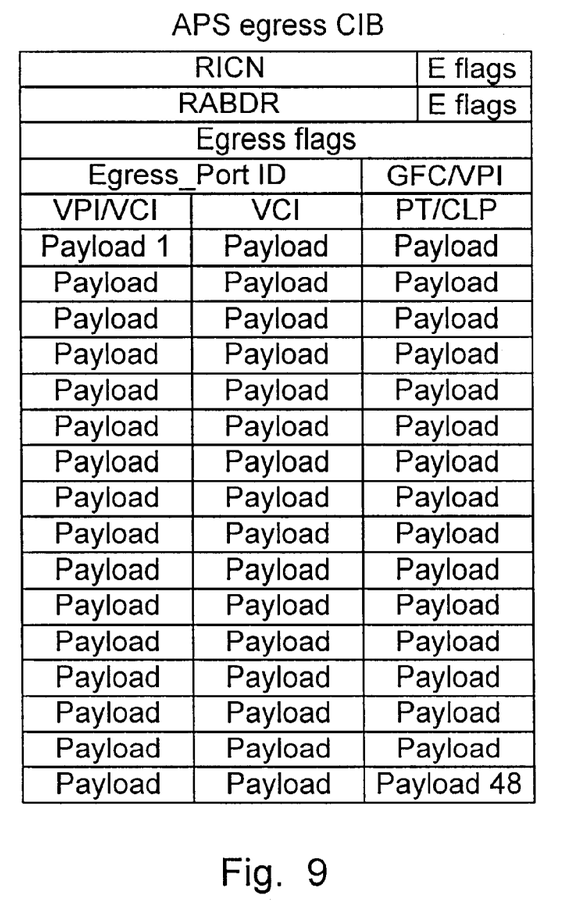
FIG. 9 illustrates an Available Bit Rate (ABR) processing subsystem (APS) egress CIB.

The APS 18 receives the QMS egress CIB, and concatenates any additional cells that the APS 18 has generated for transmission, such as resource management (RM) cells. The APS 18 needs to access control information from the QMS 19, which is held in the egress flags field of the QMS egress CIB, to decide whether or not to add its own cells to the egress flow. If the APS 18 is concatenating a cell to the QMS egress CIB, then an APS egress CIB containing that cell is generated by the APS 18, which would be 42 data transfers in length. The APS egress CIB also contains a field that identifies the port through which the APS-generated cell must be transmitted. This is shown in FIG. 9 which illustrates the APS egress CIB. If the APS 18 is not concatenating a cell, then the payload and cell header fields of the APS egress CIB are filled with null data. Flags in the flag fields of the APS egress CIB are set to indicate to downstream bus components whether or not a cell has been concatenated by the APS 18.

The APS egress CIB is transferred to the OCM 17 at stage E. The OCM 17 simply forwards the APS egress CIB if it has no cells of its own to insert. If the OCM 17 has an OAM cell to transmit, a contingency that is determined independently of any flags included in the APS egress CIB, the OCM 17 will insert the cell into the egress flow. More specifically, if the APS 18 does not send a cell, and the OCM 17 has a cell to transmit, then it overwrites the cell fields of the APS egress CIB, which are filled with null data. If the APS 19 has inserted a cell into the APS egress CIB, and the OCM 17 wishes to add another cell to the egress flow, then the OCM 17 intercepts the APS egress CIB, delays its transfer while it creates a new APS egress CIB containing the cell it wishes to transmit, and then forwards both resulting APS egress CIBs downstream to the TUB 16. The variable insertion of a CIB by the OCM 17 is transparent to downstream bus components since CIBs that are created by the OCM 17, and CIBs that are merely received and forwarded by the OCM 17, both have the formats of the APS egress cell shown in FIG. 9.

Figure 10:
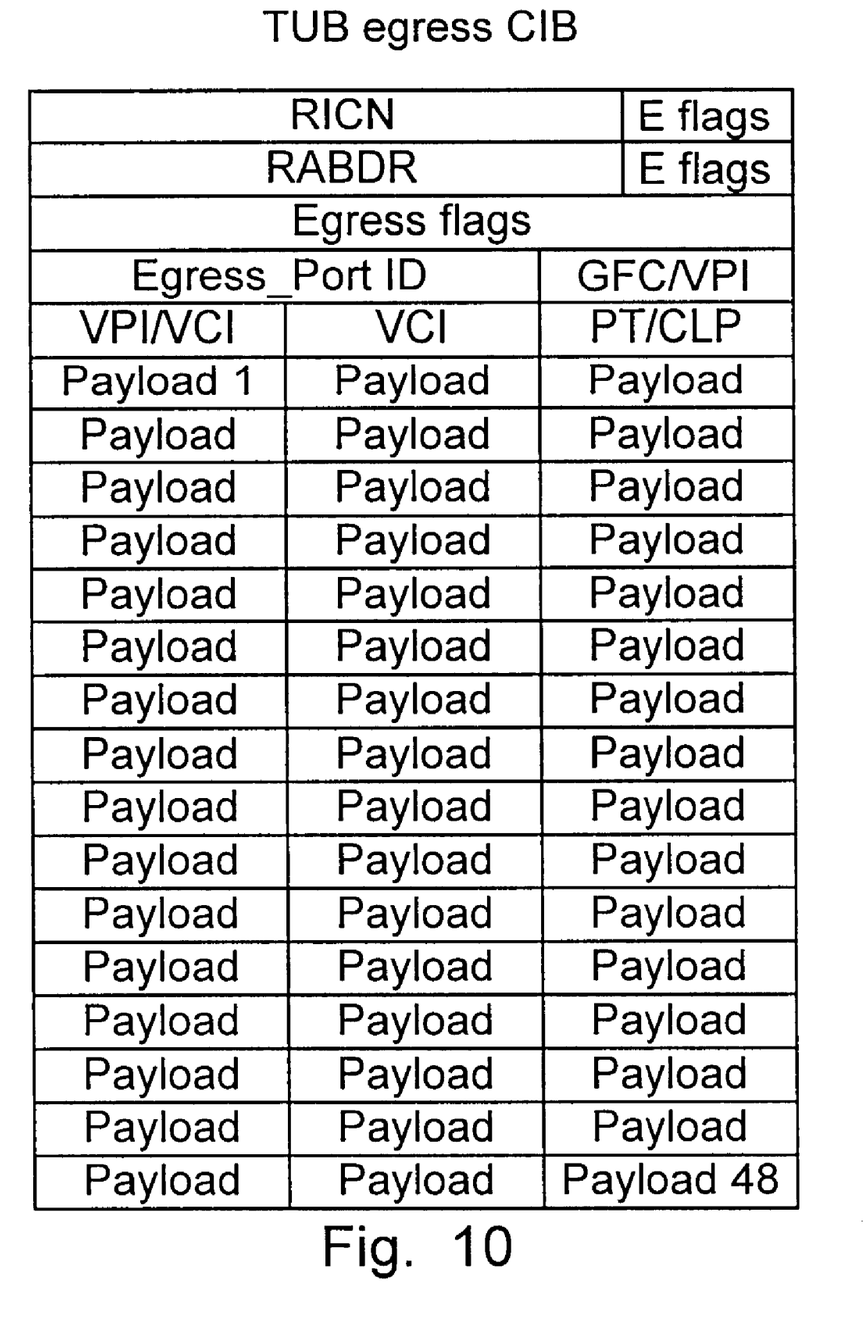
FIG. 10 illustrates a TUB egress CIB.

At stage F of the chronology illustrated by FIG. 4, the TUB 16 receives the APS egress CIB, and generates a TUB egress CIB, which is illustrated in FIG. 10. The TUB egress CIB, which is 21 data transfers long, is generated when the TUB 16 overwrites the cell header fields with egress look-up data. The TUB 16 must account for the variation in bandwidth of the useful data contained in the APS egress CIBs which, as mentioned before, may or may not contain a cell to transmit. In most cases, neither the OCM 17 nor the APS 18 would have inserted cells into the egress flows, and so the TUB egress CIB would simply include the egress look-up data inserted by the TUB 16, and the null data included in the APS egress CIB.

Figure 11:
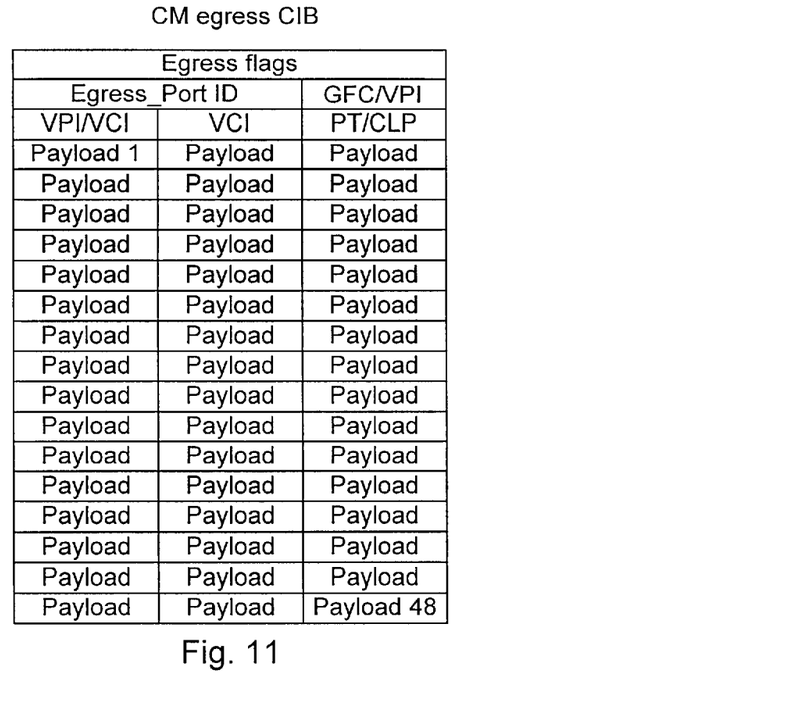
FIG. 11 illustrates a CM egress CIB.

At stage G of the chronology illustrated by FIG. 4, the TUB egress CIB arrives at the CM 14. If the upstream bus components in the CPM 15 have inserted a cell into the CIB, that cell is stripped from the CIB and placed in a CM ingress CIB, which is passed through to the IOM 11. If the upstream bus components in the CPM 15 have not inserted a cell into the CIB, the data in the headers of the TUB egress CIB is used to read from the CM 14 a cell that the QMS 19 has recently designated for transmission. More specifically, the CM 14 uses the RBADR and the RICN fields to read the cell to be transmitted out from memory, and writes the cell into the CM egress CIB. The CM egress CIB, which is illustrated in FIG. 11, comprises 19 data transfers, and is passed downstream to the IOM 11.

At stage H, the IOM 11 consumes the CM egress CIB. More specifically, it strips away the cell enclosed within the CM egress CIB, and uses any control attached information inserted by the upstream bus components (i.e. the egress flags field) to forward the cell to the appropriate network link 7. The transmission of the cell through one of the network links 7 ends the cell-processing sequence performed on the switch, the sequence being executed by a series of components that communicate with one another across generic buses 12,13,20,21 using CIBs.

It is to be noted that in order for the switch to support a 2.5 Gbps cell switching rate, each frame (which, as mentioned before, is transferred between bus components every 694 ηs) must carry four CIBs.

Exchanges of PDUs on the switch can serve purposes other than switching a cell between the network links 7, or transferring OAM or RM cells to the links 7 for transmission. Many PDUs are exchanged in order for the switch to be able to provide features that require coordination between several bus components. Unlike the information contained in the CIBs, such control information can be transmitted independently of cell flows. Control update blocks (CUBs) CUBs, the second type of PDU included in bus frames, are used to carry such control information.

CUBs are created and consumed by bus components. In a preferred embodiment, the IOM 11 and the APS 18 are the only bus components that create CUBs, while the TUB 16 and the QMS 19 are the only bus components that consume CUBs. CUBs are passed though bus components lying between creating and consuming bus components. Though according to this embodiment, no information is added, dropped or concatenated to a CUB as it passes through bus components, other embodiments could easily support such functions.

Figure 12:
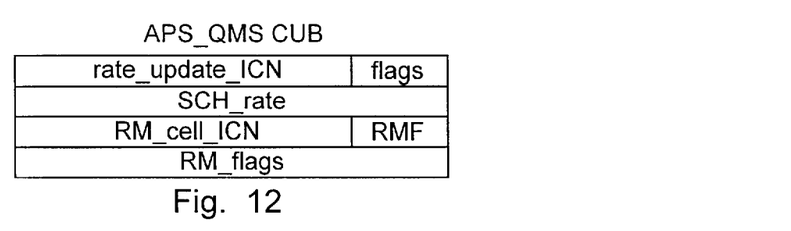
FIG. 12 illustrates an APS_QMS control update block (CUB)

The APS 18 generates CUBs to provide control information to the QMS 19 and the TUB 16. More specifically, scheduling-rate update and RM connection status information is sent to the QMS 19 in an APS_QMS CUB, which is illustrated in FIG. 12. The ICN of the connection whose rate is being communicated is in the rate_update_ICN field while the service-rate of the connection is in the SCH_rate field. The ICN of the resource management connection whose status is being updated is contained in the RM_cell_ICN field, while the status of the RM connection is described in the RM_flags field. Four APS_QMS CUBs are included in each bus frame.

Figure 13:
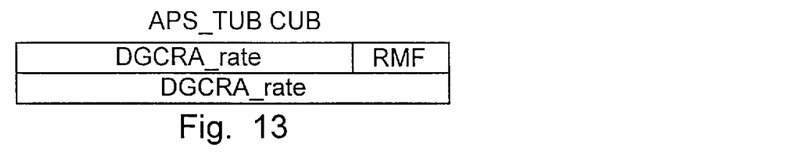
FIG. 13 illustrates an APS_TUB CUB.

Information required in order to update the policing parameters of the DGCRA on the TUB 16, is sent from the APS 18 in an APS_TUB CUB, which is illustrated in FIG. 13. The ICN of the connection whose DGCRA parameters are being updated is contained in the DGCRA_ICN field, while the DGCRA parameters for that connection are in the DGCRA_rate field. Four APS_TUB CUBs are included in each bus frame.

Figure 14:
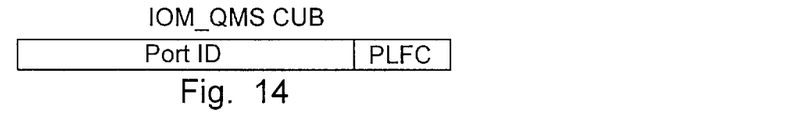
FIG. 14 illustrates an IOM_QMS CUB.

The IOM 11 generates IOM_QMS CUBs to provide a flow of feedback information to the QMS 19. Such a flow is needed because the timing of cell departures from the IOM 11 is assumed to be asynchronous with respect to the timing of cell departures from the CM 14. This necessitates a flow of feedback information from egress buffers on the IOM 11 to the scheduler on the QMS 19 in order to maximize egress rates from the switch without overflowing the egress buffers. This flow of feedback information is referred to as Physical Layer Flow Control (PLFC). PLFC updates regarding the status of the buffers on the IOM 11 are communicated from the IOM 11 to the QMS 19 using the IOM_QMS CUB, which is illustrated in FIG. 14. The identity of the port whose egress buffer is being described is in the Port ID field, while the status of the buffer is described in the PLFC field. Four IOM_QMS CUBs are inserted into each bus frame, assuming the 2.5 Gbps switch of FIG. 4 terminates four network links 7. If more than four network links 7 are being terminated by a single 2.5 Gbps CPM 15, then either more IOM_QMS CUBs must be included in each bus frame, or some IOM_QMS CUBs will each have to carry feedback information relating to more than one of the network links 7.

Communication between the CU 8 and the SU 6 takes place using the third type of PDUs contained in bus frames, which are called software control packets (SCPs). More specifically, each bus component is given a unique device identification (ID) when the switch is being initialized. The device IDs are used to route a series of SCPs, through the high-speed link 9 and/or the buses 12,13,20,21, between the CU 8 and the bus components, or between the bus components. The SCPs can carry requests to read from or write to the registers and context memories of bus components, notifications of events that have occurred, or responses to requests.

The transfer of CIBs, CUBs and SCPs across the buses 12, 13, 20, 21 is coordinated by a physical layer device protocol shared by all the bus components. The device protocol is based on known synchronous mapping methods that specify how contents of PDUs are to be passed through bus components from one bus segment to another, based on their location within the bus frame. The protocol is implemented, in a preferred embodiment, by adding to each chip that implements one of the bus components 11, 14, 15, 16, 17, 18 and 19, a single Encapsulating Logic Ring (ELR). The ELR forms the outer part of the chip and provides an interface between the buses 12, 13, 20 and/or 21 and the encapsulated bus component, which forms the inner part of the chip and contains the function specific part of the chip.

Each ELR provides physical layer services to its enclosed function specific bus component. Two types of interfaces are implemented by ELRs deployed within the architecture of FIG. 2 and FIG. 3—one type is used to interface with the twelve signal-line buses 20, 21 that are internal to the CPM 15, while the other type is used to interface with the twenty-four signal-line buses 12, 13 that are external to the CPM 15.

Figure 15:
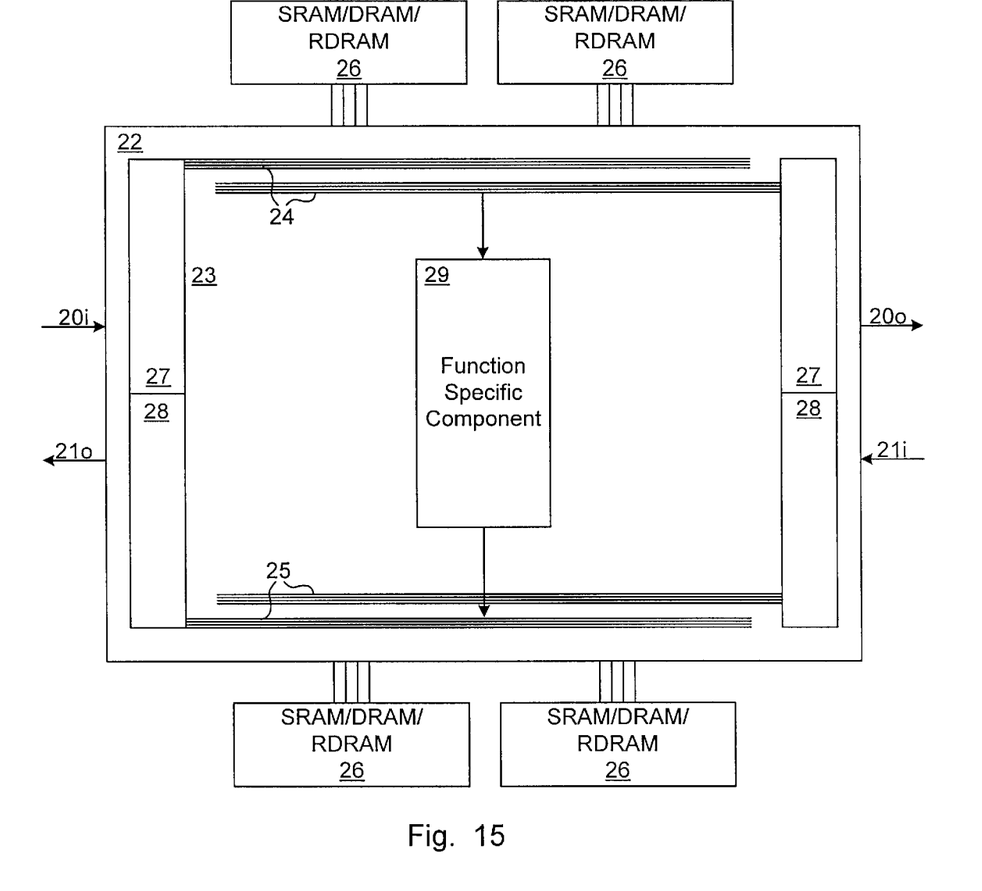
FIG. 15 illustrates an encapsulating logic ring (ELR)

A chip comprising a function specific bus component 29 which could be any of the components 11, 14 or 16 through 19, and an ELR 22, is illustrated in FIG. 15. The ELR 22 has an area 23 into which one or more function specific bus components 29 can be inserted. In other embodiments of the novel architecture, wherein a plurality of components replace any one of the bus components 11, 14 and 16 through 19, the area 23 is large enough to accommodate the replacing plurality of components. Therefore, if three components are used to implement the QMS 19 in an alternative embodiment for example, the three components could be inserted into the single ELR provided their collective footprint-size does not exceed the footprint-size of the area 23. Any inserted components 29 are connected to two pairs of internal buses 24, 25, both buses of each pair flowing in the ingress and egress directions respectively. If more than one component 29 occupies the area 23, the data flow through the components 29 can be load-shared by connecting different components 29 to different buses in each pair 24, 25. Context RAM chips 26, for storing data required by the components 29 such as linked-list pointers and look-up tables, are directly attached to the components 29 (the connections between the RAM chips 26 and any function specific components 29 within the area 23 are not shown).

The internal ELR buses 24, 25, connect the ingress and egress external buses 12, 13 or 20, 21 to any enclosed function specific component 29, through hardware logic blocks 27,28 that implement the device protocol.

The input logic block 27 that receives traffic from the input ingress bus 20$i$ or input egress bus 21$i$, monitors the traffic that flows through from either bus. Once the input logic block 27 detects traffic from the input ingress bus 20$i$ for example, the traffic is organized into two groups. One group contains SCPs, and the other group contains CUBs and CIBs. Each group is sent, through the internal bus 24, to the appropriate parts of the function specific bus component 29 for processing. The input logic block 27 also supplies control and framing information to the output logic block 28 connected to the output ingress bus 20$o$. In the meantime, the output logic block 28 assembles bus frames for transport across the output ingress bus 20$o$. The output logic block 28 fills the frames with data sent from the enclosed function specific component 29 through the internal bus 24, selecting which part of the outgoing bus frames to populate with data using the control information supplied by the input logic block 27.

Data flowing in the egress direction over the buses 21$o$, 20$o$ is handled by the ELR 22 using methods similar to the above-described methods relating to data flowing in the ingress direction.

When the above-described method of intra-switch communication is used, a change in the interface of any one function specific bus component does not necessitate replacing all bus components that communicate with the changed component. Instead, the following procedure is followed. When a change in the implementation of a bus component requires that new information be communicated by the component to other components, the bus frames passed between the components are reformatted to accommodate the transfer of the new information. This reformatting can involve adding, removing or resizing the fields within existing CIBs, CUBs or SCPs, or even adding or removing entire CIBs, CUBs or SCPs within the bus frames. Once the bus frames have been reformatted, the ELRs used by other bus components are changed, such that the components can continue to access the same information notwithstanding the formatting changes applied to the bus frame. More specifically, the chips used to implement the other bus components are replaced by new chips, whose ELRs have been programmed to read data from and write data to different parts of each rearranged bus frame. The function specific bus components within the new chips are identical to the function specific bus components within the old chips; only the ELR parts of the chips differ. This means that the investments made in designing the complex function-specific bus components are preserved. The replacement chips simply make use of ELRs whose logic blocks 27,28 are programmed to access different parts of the bus frames. The adaptation to a new bus frame format is thus easily accomplished.

It is to be noted that any increases in bandwidth requirements brought about by changing the implementation of any one bus component, can be easily accommodated by the above-described architecture. This is because the buses 12, 13, 20 and 21, have the capacity to accommodate almost double the amount of bandwidth required by the bus components in the embodiment described above. Even at the point in the above-described embodiment where the highest bus utilization occurs, there is still ample available bandwidth to accommodate new messages. The highest bus utilization rate occurs in the part of the bus 20 that allows traffic to flow from the APS 18 to the QMS 19. At this point, four TUB-egress CIBs, four IOM_QMS CUBs and four APS_QMS CUBs must all be transferred in each bus frame across the smaller 12-bit bus used to interconnect components inside the CPM 15. Even this maximal flow however, amounts only to 102 data-transfers every 694 ηs which is less than 50% of the capacity of the bus 20. Even if SCPs to and from the CU 8, are assumed to occupy 622 Mbps (i.e. a rate even higher than the rate that would be supported if the link 9 with the CU 8 supported the OC-12 protocol, and was fully utilized), the utilization rate of the bus 20 would still remain below 60%. The above-described architecture can thus accommodate substantial increases in the amount of bandwidth required by the switch.

It will be apparent to those skilled in the art that the aforementioned architecture facilitates the decoupling of the CU 8 and the SU 6, of the IOM 11, CM 14 and the CPM 15, and of all unrelated functional components in the CPM 15. Since additionally, the architecture is partitioned so that functions that are prone to change are isolated on single easily replaceable bus components, the architecture described above substantially reduces maintenance and upgrade costs.

The above-described architecture also simplifies the design of ATM switches. More specifically, it allows ATM switches to be built by placing components designed to communicate with each other according to the above-described methods on standard generically applicable buses such as a Versa Module Eurocard (VME) bus or a Small Computer System Interface (SCSI) bus.

The above-described architecture can also be applied to serve a wide variety of purposes. Though it is suited to handle ATM traffic in a preferred embodiment, it can also handle other forms of packet-switched traffic and time division multiplexed traffic. Furthermore, though the architecture can be used to form the core of a stand-alone switch as illustrated in FIG. 2 and FIG. 3, it also can be used as an embedded switching means that augments the capabilities of a higher capacity switch.

It is to be noted that the performance of the switch does not have to be significantly compromised to realize these benefits. This is firstly because the above-described partitioning groups related functions for mapping on to the same components. This improves the utilization of several vital switch resources, such as memory. Secondly, though the use of the messaging system described above does introduce overhead into the switch that is not present in switches that use component-specific connections, which in turn introduces additional latency into the performance of the switch, this latency is not significant. More specifically, the additional latency introduced by the above-described architecture amounts to under 7% of the latency that already exists in the switch due to the time required by components to perform their functions.

Numerous modifications and variations of the present invention are possible in light of the above teachings. It is therefore to be understood that within the scope of the appended claims, the invention may be practised otherwise than as specifically described herein. For example, it is to be noted that bidirectional generic buses could replace the unidirectional generic buses 12, 13, 20, 21 described above.

Figure 16A:
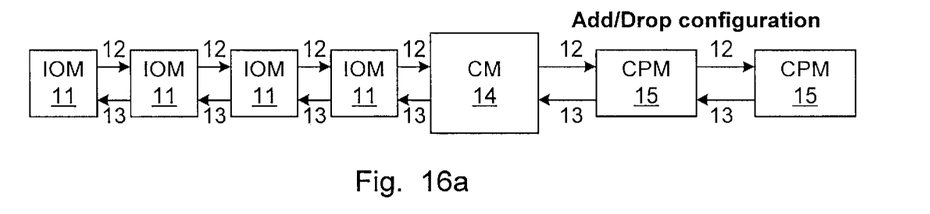
FIG. 16a illustrates an add/drop configuration according to an embodiment of this invention.
Figure 16B:
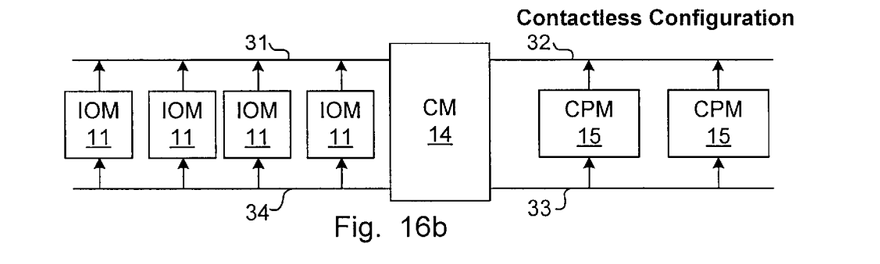
FIG. 16b illustrates a contactless configuration according to an embodiment of this invention.
Figure 16C:
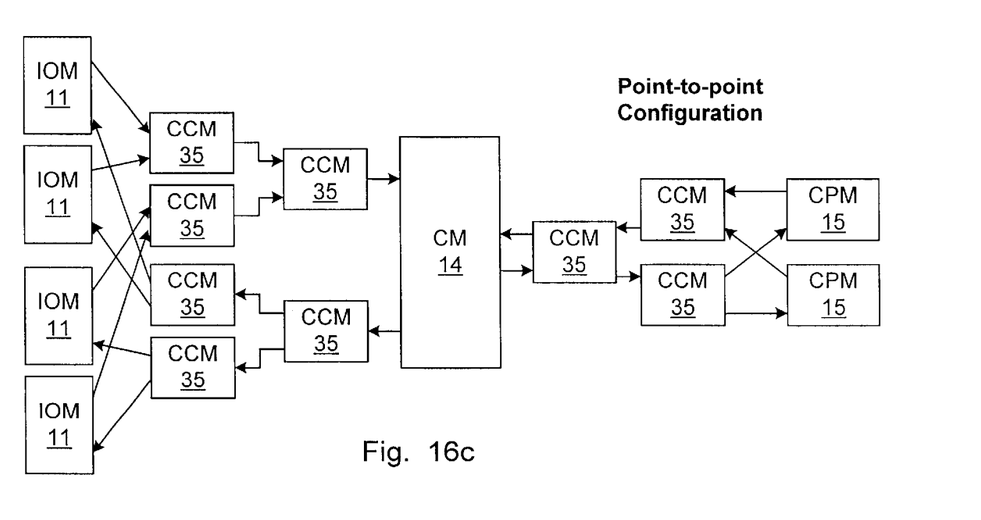
FIG. 16c illustrates a point-to-point configuration according to an embodiment of this invention.

It also is to be noted that the above-mentioned partitioning and messaging systems could be implemented using several different configurations, such as those illustrated in FIGS. 16a, 16b and 16c. All three configurations can be adapted to use the novel messaging system described above by making minor adjustments to the device protocol implemented by the ELRs 22.

FIG. 16a illustrates the add/drop configuration, which is similar to that shown in FIG. 2 and FIG. 3. It differs from the embodiment described above in that a plurality of IOMs 11 and CPMs 15 are used. Only one of the IOMs 11 and one of the CPMs 15 are directly connected to the CM 14 in the configuration of FIG. 16a. All the indirectly connected IOMs 11 and CPMs 15 must send their traffic through the directly connected modules, using the connection methods described above. The same buses 12, 13, 20, 21 used in the above-described embodiment can be used in the configuration of FIG. 16a. Slightly larger buses may be required to handle the additional traffic that could originate at the additional IOMs that are deployed in this particular configuration.

FIGS. 16b illustrates a contactless configuration, which is similar to the configuration of FIG. 16a, except that the plurality of buses 12,13,20,21 are replaced by pairs of shared buses 31 through 34. The shared buses 31 through 34 are generic unidirectional buses as in the embodiments described above. Implementing this configuration as opposed to the ones described above, primarily requires extending the device protocol to determine how the buses 31 through 34 are to be shared by the bus components.

FIG. 16c illustrates a point-to-point configuration which allows for the division of the ingress or egress traffic flowing through a switch into more manageable sub-flows. The sub-flows are routed through generic buses, as in the embodiments described above. Each sub-flow can be switched through one of a plurality of dynamically allocatable paths connecting the IOMs 12 to the CM 14, and the CM 14 to the CPMs 15, using cross-connect modules (CCMs) 35. CCMs are simply space-switches that route traffic from one of a plurality of inputs to one of a plurality of outputs. As is the case with other bus components, the chips on which CCMs 35 are implemented have ELRs 22 that surround the space-switch, and which implement the device protocol known to all the bus components.

In other possible configurations, the positions of the CM 14 and the CPM(s) 15 relative to the IOM 11 can be swapped. Under this embodiment, an ingress cell would not be buffered in the CM 14 until the QMS 19 has had a chance to process information related to the cell. The CIBs would therefore be used to carry a cell through an ingress path that extends from the IOM 11 to the various components of the CPM 15 to the CM 14. The cell will remain in the CM 14 until the QMS 19 initiates the transmission of the cell. The egress CIBs will then be used to carry the cell from the CM 14 through the components of the CPM 15 to the IOM 11. Changes would have to be made to the ingress and egress CIBs that will be obvious to those skilled in the art, if the positions of the CM 14 and the CPM 15 were swapped. The QMS egress CIB, for example, will contain the actual cell to be transmitted from the CM 14, instead of the buffer address of the cell within the CM 14.

In another variation, a space switch can be used to interconnect a plurality of the SUs 6 illustrated in FIG. 2, allowing the architecture to be gracefully scaled to a higher switching capacity. Other means such as a backplane could be used to interconnect the SUs.

In yet another variation, each function-specific bus components and its respective ELR can be implemented as either an ASIC, a discrete block on a printed circuit board (PCB), or an individual PCB.

We claim:

1. A packet switch comprising a switching unit (SU) for switching packets between network links, and a computing unit (CU) connected to the SU through a network link for implementing software control functions over the SU, wherein the SU comprises a plurality of functional components that are interconnected by generic buses, and wherein the components communicate with one another using program data units (PDUs) that are formatted and transmitted according to a shared device protocol;

wherein PDUs are placed in bus frames that are passed from component to component, wherein information is exchanged between the components by adding information to or dropping information from fields that comprise the PDUs, or by concatenating new fields to the PDUs, as the frames pass from component to component, and wherein a shared device protocol is implemented that allows all components to usefully perform the passing, adding, dropping and concatenating functions; and wherein each component is implemented on a function-specific part of a chip, and wherein the device protocol is implemented on another part of the chip, said other part providing an interface between the buses and the function specific part of the chip, and hereinafter being called an encapsulating logic ring (ELR).

2. The packet switch of claim 1 wherein each ELR comprises a plurality of internal buses for transferring PDU contents to and from its encapsulated component it serves, context memory for use by its encapsulated component, a plurality of hardware input logic blocks for transferring PDU contents from the external generic buses to the internal buses, and a plurality of hardware output logic blocks for transferring PDU contents from the internal buses to the external generic buses.

3. The packet switch of claim 2 wherein the logic blocks can be programmed to transfer data into, and transfer data from, predetermined parts of the bus frames.

4. A packet switch comprising a switching unit (SU) for switching packets between network links, and a computing unit (CU) connected to the SU through a network link for implementing software control functions over the SU, wherein the SU comprises a plurality of functional components that are interconnected by generic buses, and wherein the components communicate-with one another using program data units (PDUs) that are formatted and transmitted according to a shared device protocol;

wherein the components of the SU comprise the following components:

at least one input/output module (IOM) for terminating network links;

a cell memory (CM) for storing packets received from the network links until they are scheduled for transmission from the switch; and at least one cell processing module (CPM) directly connected to the memory for controlling the packet traffic flowing through the switch;

wherein a plurality of IOMs are connected in series to each other such that a single given IOM is directly connected to components other than IOMs, and such that the rest of the IOMs must connect with the components other than IOMs through said single given IOM.

5. A packet switch comprising a switching unit (SU) for switching packets between network links, and a computing unit (CU) connected to the SU through a network link for implementing software control functions over the SU, wherein the SU comprises a plurality of functional components that are interconnected by generic buses, and wherein the components communicate with one another using program data units (PDUs) that are formatted and transmitted according to a shared device protocol;

wherein the components of the SU comprise the following components:

at least one input/output module (IOM) for terminating network links;

a cell memory (CM) for storing packets received from the network links until they are scheduled for transmission from the switch; and at least one cell processing module (CPM) directly connected to the memory for controlling the packet traffic flowing through the switch;

wherein a plurality of CPMs are connected in series to each other such that a single CPM is directly connected to components other than CPMs, and such that the rest of the CPMs must connect with the components other than CPMs through said single CPM.

6. A packet switch comprising a switching unit (SU) for switching packets between network links, and a computing unit (CU) connected to the SU through a network link for implementing software control functions over the SU, wherein the SU comprises a plurality of functional components that are interconnected by generic buses, and wherein the components communicate with one another using program data units (PDUs) that are formatted and transmitted according to a shared device protocol;

wherein the components of the SU comprise the following components:

at least one input/output module (IOM) for terminating network links;

a cell memory (CM) for storing packets received from the network links until they are scheduled for transmission from the switch; and at least one cell processing module (CPM) directly connected to the memory for controlling the packet traffic flowing through the switch;

wherein a plurality of IOMs are connected to components other than IOMs through a plurality of buses and a plurality of cross-connect modules (CCMs) that each contain a cross-connect switch, such that the ingress and egress flows through the switch can be divided into sub-flows that can each pass through one of a plurality of dynamically allocatable paths connecting the IOMs and the components other than IOMs.

7. A packet switch comprising a switching unit (SU) for switching packets between network links, and a computing unit (CU) connected to the SU through a network link for implementing software control functions over the SU, wherein the SU comprises a plurality of functional components that are interconnected by generic buses, and wherein the components communicate with one another using program data units (PDUs) that are formatted and transmitted according to a shared device protocol;

wherein the components of the SU comprise the following components:

at least one input/output module (IOM) for terminating network links;

a cell memory (CM) for storing packets received from the network links until they are scheduled for transmission from the switch; and       at least one cell processing module (CPM) directly connected to the memory for controlling the packet traffic flowing through the switch;

wherein a plurality of CPMs are connected to components other than CPMs through a plurality of buses and a plurality of cross-connect modules (CCMS) that each contain a cross-connect switch, such that the ingress and egress flows through the switch can be divided into sub-flows that can each pass through one of a plurality of dynamically allocatable paths connecting the CPMs and the components other than CPMs.

8. A packet switch comprising a switching unit (SU) for switching packets between network links, and a computing unit (CU) connected to the SU through a network link for implementing software control functions over the SU, wherein the SU comprises a plurality of functional components that are interconnected by generic buses, and wherein the components communicate with one another using program data units (PDUs) that are formatted and transmitted according to a shared device protocol;

wherein the components of the SU comprise the following components:

at least one input/output module (IOM) for terminating network links;

a cell memory (CM) for storing packets received from the network links until they are scheduled for transmission from the switch; and       at least one cell processing module (CPM) directly connected to the memory for controlling the packet traffic flowing through the switch;

wherein the CPM comprises the following:

a Translation, Usage Parameter Control, and Buffer Management (TUB) component that is connected to a component external to the CPM, and which is used for performing ingress and egress address translations, for implementing policing functions, and for performing buffer management functions;

an OAM Control Module (OCM) component that is connected to the TUB ASIC, and which is used for terminating and sourcing Operations, Administration and Maintenance (OAM) flows;

an Available Bit Rate (ABR) processing subsystem (APS) component that is connected to the OCM component, and which is used for implementing rate based flow control; and       a Queue Management and Scheduling Subsystem (QMS) component that is connected to the APS component, and which is used for maintaining packet queues and for scheduling packet transmissions from the switch.

9. The packet switch of claim 8 wherein unidirectional ingress and egress generic buses are used to implement the connections between the components comprising the CPM, each bus comprising a plurality of signal lines and each signal line being capable of carrying traffic.

10. The packet switch of claim 8 wherein bidirectional generic buses are used to implement the connections between the components comprising the CPM, each bus comprising a plurality of signal lines and each signal line being capable of carrying traffic.

11. The packet switch of claim 8 wherein the IOM is directly connected to the CM which is directly connected to the TUB.

12. The packet switch of claim 11 wherein program data units (PDUs) called cell information blocks (CIBs), which each contain information relating to a packet that has recently arrived on the switch, are passed from the IOM to the CM to the TUB to the OAM to the APS to the QMS.

13. The packet switch of claim 11 wherein program data units (PDUs) called cell information blocks (CIBs), which each contain information relating to a packet that has recently been scheduled for transmission from the switch, are passed from the QMS to the APS to the OAM to the TUB to the CM to the IOM.

14. The packet switch of claim 8 wherein the IOM is directly connected to the TUB, and the QMS is directly connected to the CM.

15. The packet switch of claim 14 wherein program data units (PDUs) called cell information blocks (CIBs), which each contain a-packet that has recently arrived on the switch and information related to its arrival, are passed from the IOM to the TUB to the OAM to the APS to the QMS to the CM.

16. The packet switch of claim 14 wherein program data units (PDUs) called cell information blocks (CIBs), which each contain a packet that has recently been scheduled for transmission from the switch and information relating to its transmission, are passed from the CM to the QMS to the APS to the OAM to the TUB to the IOM.

17. The packet switch of claim 8 wherein control update blocks (CUBs) are exchanged between the components of the SU in order for the switch to provide features that require coordination between more than one component.

18. The packet switch of claim 17 wherein the CUBs are sent from the APS to the QMS, and contain scheduling rate update and resource management cell status information.

19. The packet switch of claim 17 wherein the CUBs are sent from the APS to the TUB and contain information required to update policing parameters in the TUB.

20. The packet switch of claim 17 wherein the CUBs are sent from the IOM to the QMS and contain feedback information about the status of the egress buffers on the IOM.

21. The packet switch of claim 8 wherein the components are implemented on application specific integrated circuits (ASICs).

22. The packet switch of claim 8 wherein the components are implemented on logic blocks on a printed circuit board.

* * * * *